Oct. 4, 1932.  M. H. PAGE  1,880,980
SOUND REPRODUCING DEVICE
Original Filed Nov. 19, 1929
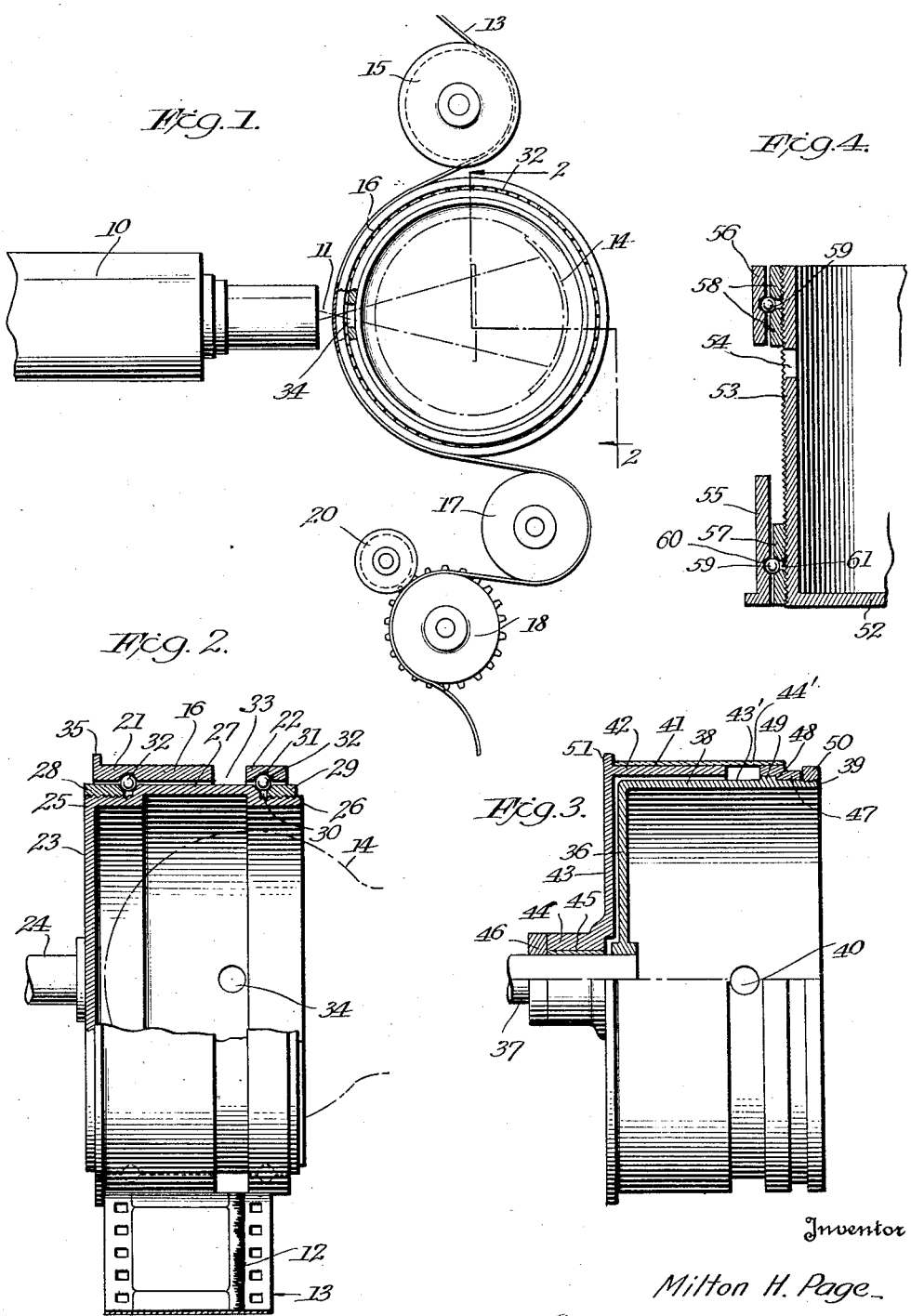
Inventor
Milton H. Page
By Cushman, Bryant & Herby
Attorneys Patented Oct. 4, 1932

1,880,980

UNITED STATES PATENT OFFICE

MILTON HARRISON PAGE, OF COHOES, NEW YORK

SOUND REPRODUCING DEVICE

Application filed November 19, 1929, Serial No. 408,394. Renewed February 19, 1932.

The present invention relates to sound translating devices and more especially to improved means for reproducing sound vibrations recorded on a film or the like.

A primary object of the invention is to provide a revoluble member for receiving the film and frictionally maintaining the same in proper operative position relative to the optical system and the light sensitive element, so that as the sound reproducing portion of the film passes a projected beam of light from the optical system, the acoustical modulated light will cause the variation of an electric current in accordance with the sound wave variations and accurately reproduce the sound recorded on the film.

Another object consists in the provision of means for adjustably mounting a revoluble film receiving member or sleeve on a stationary member, so that the revoluble member is capable of use with all types and sizes of films.

A further object comprehends the provision of means for loosely mounting a film receiving sleeve on a stationary member, so that the sleeve will be propelled only by the pressure and passing of the film thereon and thus insure clear and accurate reproduction of the sound recorded on the film.

A further object is to provide a movable member for supporting the sides of a sound film as the latter passes between the optical system and a light sensitive element to maintain the surface of the film smooth and remove any bends or kinks that might otherwise be formed in the film and would interfere with the efficient operation of the reproducer.

A still further object of the invention is to provide a sectional member or sleeve for guiding the film past the optical system, the sections of the sleeve being suitably spaced to receive the sound track portion of the film. Additionally, means are provided for maintaining the sound track portion in proper alignment with the optical system, so as to preclude the possibility of the sound track portion being deflected from its path.

Other objects and advantages of the invention will become apparent from the following description when taken in conjunction with the accompanying claims and drawing.

Referring to the drawing in which are shown several preferred embodiments of the development:

Figure 1 is a side view of a reproducing apparatus with my invention applied thereto.

Figure 2 is a sectional view taken substantially along the line 2—2 of Figure 1.

Figure 3 is a view similar to Figure 2 of a modified form of the invention.

Figure 4 is a horizontal sectional view of a further modification.

Referring to the drawing in which like numerals indicate like parts in the several views, 10 denotes an optical system of any conventional or well known type, which is arranged to project a concentrated beam of light 11 on the sound track portion 12 of a sensitized film 13.

The acoustically modulated light as it passes through the sound track portion 12 impinges upon a light sensitive element 14 for varying an electrical current in accordance with the sound wave variations produced on the track portion 12.

In order that the recorded sound such as speech, music or the like may accurately and clearly be reproduced, the film 13 is preferably carried over the guide roller 15 and firmly pressed against one side of a revoluble member 16 as it passes between the optical system 10 and the light sensitive element 14, so that the focal point of the beam of light, will be projected only on the track portion 12 of the film. A guide roller 17 receives the film as it is fed beneath the revoluble member 16 and conducts the film between a drive sprocket 18 and a pressure roller 20. The guide roller 17 may be mounted so as to be horizontally adjustable in order to vary the tension of the film as it is driven past the optical system 10 by the sprocket 18.

The revoluble member 16 which may be in the form of a sleeve or drum, is preferably composed of the sections 21 and 22 (Fig. 2) that are freely mounted on a hollow stationary member 23 supported by a shaft 24 suitably secured to the sound head portion of the machine, not shown.

The periphery of the stationary member 23 is preferably provided with reduced externally threaded end portions 25 and 26, and an enlarged medial flange portion 27. Internally threaded locking collars or rings 28 and 29 are arranged to fit on the reduced portions 25 and 26 respectively, of the stationary member 23, and have their inner ends so shaped as to coact with the opposed surfaces of the medial portion 27 to form an annular socket 30 that coacts with a complementary formed socket 31 formed in the opposed surface of sections 21 and 22 of the revoluble member 16 to provide a race way for the ball bearings 32, thus permitting the revoluble member 16 to be freely mounted on the stationary member 23 and be propelled solely by reason of its frictional engagement with the film 13 as the latter is driven by the sprocket wheel 18.

The adjacent sides of the sections 21 and 22 of the sleeve 16 are spaced relative to each other to form an annular opening 33 (Figure 2) which opening is arranged to be in alignment with an aperture 34 formed in the hollow member 23 that allows the beam of light 11 from the optical system to be projected on the light sensitive element 14 positioned within the hollow member 23.

The sound track portion 12 of the film 13 registers with the opening 33 so that when the film passes between the optical system 10 and the aperture 32 in the stationary member 23, the focal point of the beam of light 11 will be thrown upon the sound track portion 12 and the modulated light as it strikes the light sensitive element 14 will set up a current corresponding in frequency variations to the sound recorded on the track portion 12 through which it passes.

The section 21 of the revoluble member 16 is preferably formed with an annular flange 35 which receives the adjacent marginal edge of the film for maintaining the latter in proper position during the reproducing operation, thus insuring the sound track portion 12 remaining at all times in registration with the opening 33 so as to eliminate the danger of the sound track portion being moved or deflected out of its path and engaging the section 22, which would cut off portions of the sound track 12 from the aperture 34 and seriously impair the operation of the apparatus.

The collars 28 and 29, coact with the rollers 32 for maintaining the sections of the revoluble member 16 in proper position relative to the film and may be conveniently removed from the stationary member 23 so as to dismantle the parts. Moreover, as the sections 21 and 22 of the revoluble member are freely movable on the sleeve 23 they insure a very smooth reproducing operation and also tend to eliminate scratching on the film due to the pressure thereof on the sleeve 16.

The sections 21 and 22 are so spaced and positioned to support firmly the ends of the film and thus provide means for removing any kinks or bends that might otherwise be formed in the film which would interfere with the proper operation of the reproducer.

Obviously, the invention is equally applicable for use as a recorder and may be efficiently employed for translating sound or similar vibrations to a film, plate, sheet or the like on which a record is made by means of projected light being varied in accordance with the sound to be produced.

In the form of the invention exhibited in Figure 3, the hollow stationary member 36 is fixed to a shaft 37 which in turn is connected to a portion of the sound head in any suitable manner, not shown. The periphery 38 of the stationary member 36 is externally threaded as at 39 and has an aperture 40 arranged to be in horizontal alignment with the optical system 10 shown in Figure 1, to permit the modulated light as it passes through the sound track portion of the film 41 to act upon a light sensitive element such as a photo-electric cell or the like to set up currents corresponding to the frequency variations of the sound record through which the light has passed.

In this form of the invention, the inner portion of the film 41 frictionally engages the periphery or sleeve 42 of a cylindrical guide member 43 that is provided with a hub portion 44 and a bushing 45 revolubly mounted on the shaft 37. A locking nut 46 secured to the shaft 37 tends to maintain the member 43 in proper axial position relative to the stationary member 36.

A sleeve 47 mounted on the periphery 38 of the stationary member 36 acts as a support for the outer portion of the film 41 and is spaced from the sleeve 42 to provide an annular opening 43 that registers with the sound track portion 44' of the film for reproducing the sound recorded thereon, in substantially the same manner as the device Figure 2, when the film is passed between the optical system and the opening 40.

The sleeve 47 has a shoulder portion 48 that abuts a complementary portion 49 on the periphery 38 of the stationary member 36 so as to limit the inward movement of the sleeve, while an internally threaded locking collar 50 is arranged to fit on the threaded portion 39 to removably maintain the sleeve 47 in position. A flange 51 on the revoluble member 43 acts as a guide for maintaining the film 41 in proper position during the recording operation.

In the modified form of the invention illustrated in Figure 4, there is shown an adjustable construction which is readily adapted to be used with all types and sizes of films. In this form of the invention the stationary member 52 has its peripheral portion 53 externally threaded throughout its length and formed with an aperture 54 that registers with the optical system in substantially the same manner as the apertures 34 and 40 in the forms previously described. The film as it passes the optical system frictionally engages a sleeve composed of the spaced sections 55 and 56 that are revolubly mounted on two pair of collars 57 and 58 respectively, which collars are each formed of separate sections and are internally threaded so as to be adjustably secured to the periphery 53 of the stationary member 52. Ball bearings 59 fit in the race ways formed in the adjacent surfaces 60 of the sleeve sections and the space 61 between each pair of collars 57 and 58 so as to insure free rotative movement of the sleeve on the stationary member.

It will be seen that the threaded connection of the collars 57 and 58 on the periphery 53 of the stationary member 52 not only permits axial adjustment of the sleeve sections so that the width thereof may be varied to accommodate either a single or double dimension film, but also acts as a locking means for removably securing the sections of the sleeve in position.

It is to be understood that the forms of the invention herewith shown and described are merely illustrative of preferred embodiments, and that such changes and modifications thereof as fall within the purview of one skilled in the art may be made without departing from the spirit of the invention or the scope of the appended claims.

I claim:

1. A reproducing apparatus of the class described, having in combination an optical system, a stationary hollow member having an aperture in the wall thereof in alignment with said optical system, a light sensitive element in said hollow member, a sectional sleeve loosely mounted on said hollow member, the adjacent sections of said sleeve being spaced from each other at a point in alignment with said aperture, a film arranged to be carried by said sleeve past the optical system, said film having a sound track portion in alignment with the space between said section, and means for reproducing the sound recorded on the film as the latter passes the optical system.

2. A sound reproducing device of the class described, having in combination an optical system, a stationary hollow member having an aperture in alignment with said optical system, a sectional sleeve surrounding said hollow member and revoluble relative thereto, means on said hollow member for maintaining the sleeve in a predetermined position relative to the hollow member, the adjacent sections of said sleeve being annularly spaced from each other at a point in alignment with said aperture, a film in frictional engagement with said sleeve for propelling the latter as the film is carried past the optical system, said film having a sound track portion registering with the space between said sections, and means for adjusting the sections relative to each other.

3. In combination with a sound reproducer of the class described, an optical system, a hollow member having an aperture in the wall thereof in alignment with said optical system, a light sensitive element associated with said hollow member, the periphery of said hollow member being externally threaded, a cylindrical member revolubly mounted on said hollow member, and a collar threaded to an end portion of said hollow member for maintaining the cylindrical member in position on said hollow member.

4. In combination with a sound reproducer of the class described, an optical system, a hollow member having an aperture in the wall thereof in alignment with said optical system, a light sensitive element associated with said hollow member, the periphery of said hollow member being externally threaded, a revoluble sleeve mounted on said hollow member and means threaded to the end portion of the hollow member for maintaining the sleeve in position.

5. In combination with a sound reproducer of the class described, an optical system, a hollow member having an aperture in the wall thereof in alignment with said optical system, a light sensitive element associated with said hollow member, the periphery of said hollow member being externally threaded, a pair of collars threadedly connected to the end portions of said hollow member, a sleeve encircling said collars, the opposed surfaces of said sleeve and said collars having annular grooves therein, and ball bearings mounted in said grooves for permitting free movement of the sleeve relative to the hollow member.

6. In combination with a sound reproducer of the class described, an optical system, a hollow member having an aperture in the wall thereof in alignment with said optical system, a light sensitive element associated with said hollow member, the periphery of said hollow member being externally threaded, a pair of locking collars threaded to the end portions of said hollow member, a sectional sleeve enclosing the periphery of said hollow member and revolubly mounted relative thereto, the adjacent end sections of said sleeve being annularly spaced at a point in alignment with said aperture, a film in frictional engagement with said sleeve for propelling the latter as the film is carried past the optical system, said film having a sound track portion registering with the space between said sections and means for adjusting the sections axially relative to each other.

7. In combination with a sound reproducer of the class described, an optical system, a hollow member having an aperture in the wall thereof in alignment with said optical system, a light sensitive element associated with the hollow member, a sectional sleeve encircling the outer surface of said hollow member, the adjacent ends of said sleeve being spaced from each other at a point in alignment with said aperture, a film frictionally engaging said sleeve adjacent said optical system, said film having a sound track portion in alignment with the space between said sections, and means on said sleeve for maintaining the sound track portion of the film in registration with said aperture.

8. In combination with a sound reproducer of the class described, an optical system, a hollow member having an aperture in the wall thereof in alignment with said optical system a light sensitive element associated with the hollow member, a sectional sleeve encircling the outer surface of said hollow member, the adjacent ends of said sleeve being spaced from each other at a point in alignment with said aperture, a film frictionally engaging said sleeve adjacent said optical system, said film having a sound track portion in alignment with the space between said sections, said sleeve having a flange thereon for maintaining the sound tarck portion of the film in alignment with said aperture.

9. In combination with a sound reproducer of the class described, an optical system, a hollow member having an aperture in the wall thereof in alignment with said optical system, a light sensitive element associated with the hollow member, a sectional sleeve encircling the outer surface of said hollow member, the adjacent ends of said sleeve being spaced from each other at a point in alignment with said aperture, a film frictionally engaging said sleeve adjacent said optical system, said film having a sound track portion in alignment with the space between said sections, the inner section of said sleeve having an annular flange arranged to engage said film and maintain the sound track portion thereof in alignment with said aperture.

10. In a sound reproducer, means for guiding and maintaining the film in proper position relative to the optical system, comprising a fixed hollow cylindrical member having an opening in the periphery thereof, a sectional sleeve encircling said stationary member and revoluble relative thereto, the adjacent ends of said sleeve being spaced from each other at a point in alignment with said opening, means for adjusting the sections of the sleeve relative to each other, and means for maintaining the sound track portion of a film in registration with said opening.

In testimony whereof I have hereunto set my hand.

MILTON HARRISON PAGE.